United States Patent [19]

Haar

[11] 4,406,213
[45] Sep. 27, 1983

[54] MECHANICALLY CONTROLLED BRAKE POWER BOOSTER

[75] Inventor: Lucas H. Haar, Niddatal, Fed. Rep. of Germany

[73] Assignee: ITT Industries, Inc., New York, N.Y.

[21] Appl. No.: 253,432

[22] Filed: Apr. 13, 1981

[30] Foreign Application Priority Data

May 22, 1980 [DE] Fed. Rep. of Germany ....... 3019558

[51] Int. Cl.³ ................... F15B 9/10; F01B 19/00; F16J 3/02
[52] U.S. Cl. ........................ 91/376 R; 91/369 A; 92/98 D; 92/99
[58] Field of Search ............. 91/369 A, 369 B, 369 R, 91/376 R; 92/98 D, 98 R, 99

[56] References Cited

U.S. PATENT DOCUMENTS

| 3,082,744 | 3/1963 | Gardner | 91/369 A |
| 3,688,647 | 9/1972 | Kytta | 91/369 A |
| 4,005,638 | 2/1977 | Takeuchi | 91/369 B |
| 4,005,639 | 2/1977 | Welsh, Jr. | 91/376 R |
| 4,043,251 | 8/1977 | Ohmi | 91/369 B |

Primary Examiner—Paul E. Maslousky
Attorney, Agent, or Firm—John T. O'Halloran; Alfred C. Hill

[57] ABSTRACT

To reduce the manufacturing costs of a vacuum brake booster, there is provided a holding member radially inserted into the control casing of the control piston, the holding member attaching the movable wall (booster piston) to the control casing and at the same time providing an axial stop for the control piston in the release direction of the booster. To reduce the axial length of the brake booster, the holding member is disposed within the air channel leading into the working chamber.

31 Claims, 8 Drawing Figures

4,406,213

MECHANICALLY CONTROLLED BRAKE POWER BOOSTER

BACKGROUND OF THE INVENTION

The present invention relates to a mechanically controlled brake power booster, in particular for brake systems of automotive vehicles, comprising a dish-shaped working piston movably arranged in a housing and connected to a substantially cylindrically shaped control casing accommodating a valve device to control the working pressure in a chamber having a control piston connected to an actuating rod which is held in a direction opposite to the actuating direction by a holding member radially inserted into the control casing and secured in its mounting position.

In a known vacuum brake booster of the foregoing type, for example, German Patent DE-AS No. 1,293,028, which serves to reinforce the brake pressure in an automotive vehicle, the working piston and control casing are integrally formed. The control piston carried in the control casing is held in a direction opposite to the actuating direction by a holding device radially inserted into a slot of the control casing. The slot opens into an annular groove holding the inner sealing bead of a rolling diaphragm. In the area above the slot, the holding member forms the bottom of the groove so that it is held in its mounted position by the sealing bead. Arranging the holding member in this manner has the disadvantage of not always ensuring a reliable seal in the area of the radially outer end surface of the holding member. Therefore, on actuation of the power booster, atmospheric air may enter through the leak from the working chamber into the vacuum chamber and impair the operation of the power booster.

Further, it is known, for example, from German Patent DE-OS No. 2,208,762, to manufacture the working piston and the control casing of a vacuum brake booster as separate components and to connect them in a pressure-tight manner. In this arrangement, the working piston is placed into seating engagement with a surface of the control casing and in the actuating direction it is in abutment with an annular collar of the control casing. In this mounted position, the working piston is held in position by the inner sealing bead of a rolling diaphragm engaging into a groove in the control casing. This construction has the disadvantage that the connection of the working piston is exclusively maintained by the sealing bead of the rolling diaphragm which may cause sealing bead wear and leakage.

SUMMARY OF THE INVENTION

It is an object of the present invention to provide a power booster of the type initially referred to hereinabove which permits manufacture of its working piston separate from the control casing and a connection thereof to the control casing in a simple manner.

A feature of the present invention is the provision of a mechanically controlled brake power booster comprising a booster casing; a booster piston disposed in and axially movable in the booster casing, the booster piston dividing the booster casing into a vacuum chamber and a working chamber; a control casing extending axially into and sealed relative to the booster casing, the control casing including therein a valve device to control the pressure in the working chamber, the valve device including a control piston actuated mechanically by an actuating rod; and at least one holding member radially inserted into the control casing and secured therein, the holding member having a first portion extending radially from the control casing to hold the booster piston axially against an annular collar provided on the control casing.

This arrangement provides a positive engagement between the working piston and the control casing and forms at the same time a stop for the control piston in the release direction and, therefore, does not necessitate hardly any additional construction expenditure. The positive engagement is disengageable at any time by withdrawing the holding member from the control casing. In the actuating direction, the booster force building up across the working piston is evenly transmitted to the annular collar of the control casing so that an inclined position of the control casing relative to the working piston is avoided.

In a preferred embodiment of the present invention, the holding member is inserted into a radial channel in the control casing, this radial channel connecting the valve device with the working chamber. This embodiment proves particularly suitable because it obviates the need for specially sealing the holding member relative to the working chamber or the vacuum chamber. This advantageous arrangement of the holding member is also suitable for use with power boosters having working piston and control casing integrally formed. Further, the overall axial length of the power booster is reduced because the radial channel may be provided close to the point where the rolling diaphragm is fastened to the control casing.

In another advantageous embodiment of the present invention, the radial channel includes two opposed longitudinal grooves into which the holding member engages laterally. This advantageous radial channel construction results in a very accurate positioning of the holding member. An existing tool for manufacture of the control casing requires only a minor change in the radial channel area.

Further, it will be an advantage to arrange for abutting engagement of the holding member, which is constructed as a plane plate, with the radial channel wall located close to the collar because this does not impair the flow of air in particular at the inner entry of the radial channel.

Constructing the holding member in a T-shape wherein the stepped section of the holding member extending out of the control casing has its wall surfaces close to the control casing in abutment with the control casing, affords the advantage of eliminating the necessity for radial stop surfaces for the holding member within the control casing. The abutment surface of the holding member on the control casing may be formed by the cylindrical surface on the neck of the control casing, or the surface of the control casing may be flattened adjacent to the bottom surface of the grooves.

Preferably, a clearance is provided in a radial direction between the control piston and the holding member to prevent frictional forces occurring between the holding member and the control piston from impairing the ease of motion of the control piston on actuation of the power booster.

The working piston is suitably sealed by an annular seal between the annular collar and the working piston, with the seal being prestressed in an axial direction and providing for sufficient clamping of the holding member. Further, rattling noise of the working piston is avoided, and the end clearance of the cooperating components which is caused by manufacturing tolerances is eliminated.

The seal preferably embraces the inner edge of the working piston in the manner of a U, and the end surface of the annular collar of the control casing is in direct engagement with the working piston radially outside the edge area embraced by the seal in the power booster active position. In this arrangement, the dimensions of the cylindrical inside diameter of the working piston and of the cylindrical outside diameter of the neck of the control piston are constructed such that the cylindrical sealing section arranged between the two surfaces is radially prestressed, ensuring a durable seal. The construction of this seal can be mastered easily and put into practice without problems. It is simple and not expensive.

Preferably, the seal is integrally formed with the rolling diaphragm abutting the working piston. An annular bead provided on the seal and engaging the radially outer end surfaces of the holding member enables the holding member to be held radially outwardly in a simple manner without requiring a particular alignment of the holding member in relation to the seal. In order to ensure an even engagement of the annular bead with the holding member, the radially outer end surface of the holding member forms part of the superfices of a cylinder imagined about the longitudinal axis of the control casing.

In a preferred embodiment of this invention, two diametrically opposite holding members are provided. This eliminates the need for axially guiding the working piston on the control casing.

Instead of using an annular bead provided on the seal, it is also possible to radially align the holding member in position by means of a sheet metal lug bendable during assembly. In this arrangement, the sheet metal lug may be sheared from a cup-shaped section of the working piston, with the working piston being sealed relative to the control casing between its outer edge and the opening formed by shearing the sheet metal lug. Advantageously, the working piston has a cylindrical section guided and sealed on the circumferential surface of the annular collar in order to keep the diameter of the control casing small. As the sheet metal lug is being bent, it moves into abutment with the outer end surface of the holding member, maintaining the holding member's radial position. It will be an advantage in this arrangement if the end surface of the holding member is plane to enable the sheet metal lug to be bent easily. The working piston can be removed by bending the sheet metal lug up radially.

Preferably, the sheet metal lug may also be part of a sheet metal ring arranged between working piston and holding member. In order to avoid distortion of the sheet metal ring and facilitate its alignment during assembly, the inner edge of the sheet metal ring has a pin which is directed axially towards the collar of the control casing, extends through the inner wall of the working piston and engages into an axial bore in the annular collar.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
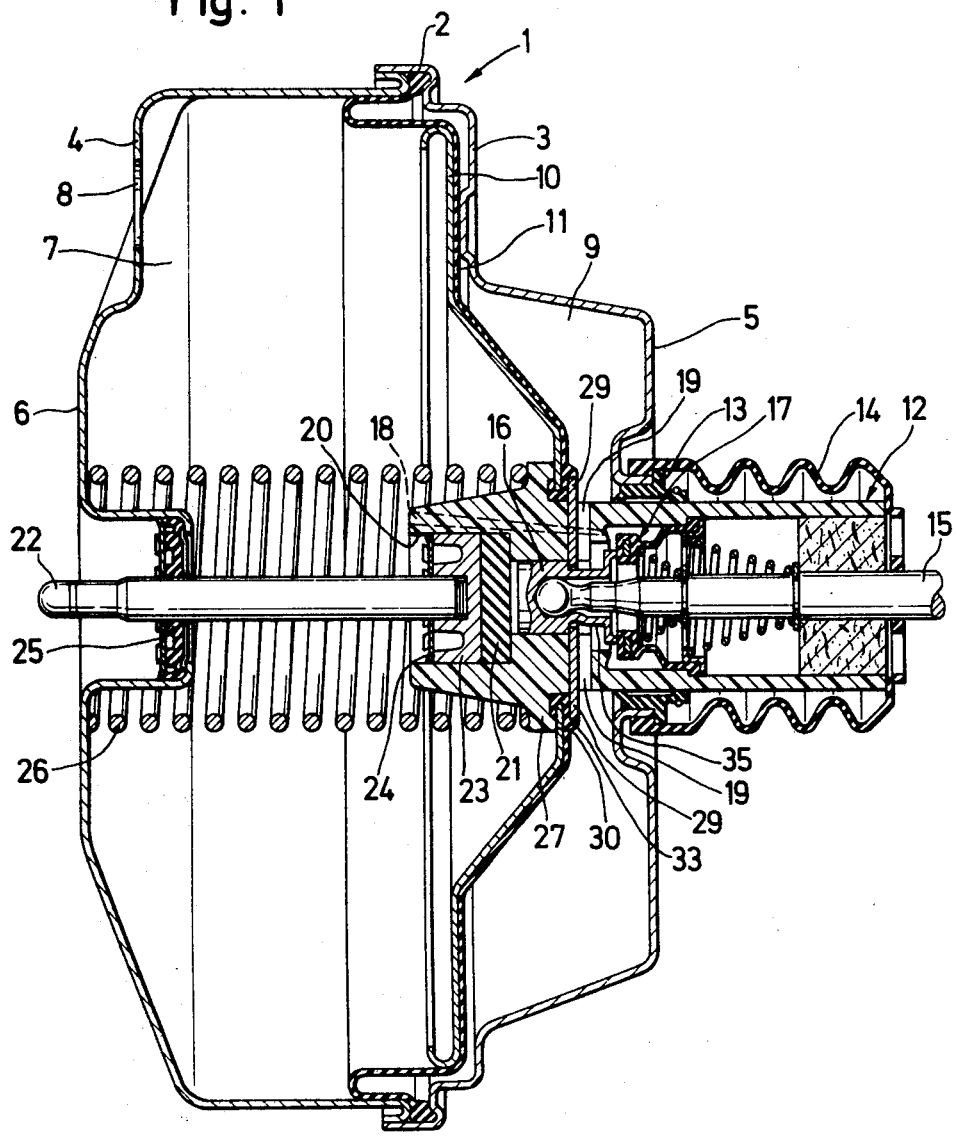
FIG. 1 is a longitudinal cross-sectional view of a first embodiment of a brake booster in accordance with the principles of the present invention wherein the rolling diaphragm and the sealing ring are integrally formed.
Figure 2:
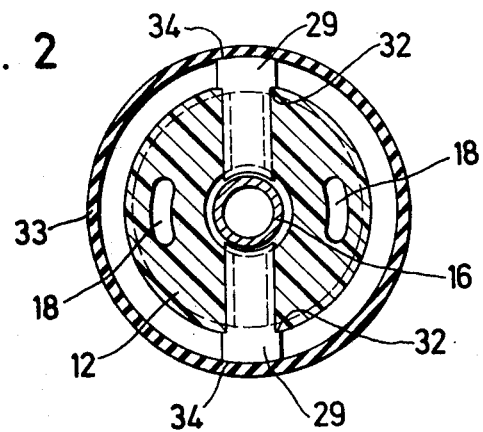
FIG. 2 is a cross-sectional view perpendicular to the longitudinal axis of the power booster of FIG. 1 taken in the plane of the holding member.
Figure 3:
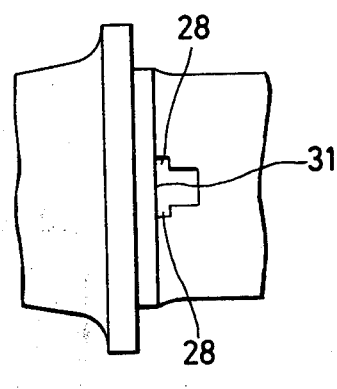
FIG. 3 is a top plan view of the control casing in the axial direction of the radial channel of FIG. 1.

Referring to FIGS. 1, 2 and 3, housing 1 of the brake booster includes two housing shells 3 and 4 interconnected at a junction 2 and having bottoms forming the transverse end walls 5 and 6 of housing 1. A movable wall subdivides the interior of housing 1 into a vacuum chamber 7 which is connected to a vacuum source via a port 8, and a working chamber 9. The movable wall includes essentially a working piston 10, a rolling diaphragm 11 abutting working piston 10 in working chamber 9, and a cylindrical control casing 12 connected to working piston 10 and rolling diaphragm 11. Rolling diaphragm 11 is clamped in a pressure-tight manner at junction 2 and embraces with its inner section the inner edge of working piston 10 in the manner of a U, sealing working piston 10 relative to control casing 12. The cylindrical neck of control casing 12 extends out of end wall 5 of housing 1 and has its surfaces protected against contamination by means of a bellows 14. Control casing 12 has a slideway ring 13 sealing working chamber 9 relative to the outside.

In the interior of the control casing 12, the control bar including operation rod 15 and control piston 16 is axially slidably arranged and adapted to be connected to a brake pedal of an automotive vehicle via a forked head (not shown). Control casing 12 further includes a valve device 17 which is actuated by control piston 16 and controls, via channels 18 and 19, the differential pressure between vacuum chamber 7 and working chamber 9. Channel 18 shown in dashed lines in FIG. 1 of the drawings is illustrated as being turned through 90 degrees in the plane of projection.

The section of control casing 12 arranged in vacuum chamber 7 includes further a stepped bore 20 in which a reaction disc 21 and a clamping sleeve 23 connected to a push rod 22 are axially held in position by means of a clamping ring 24. Push rod 22 actuates a master brake cylinder (not shown) which is fastened to end wall 6. Push rod 22 seals vacuum chamber 7 relative to the outside by means of a seal 25 secured to end wall 6.

To return the movable wall after a brake actuation, a return spring 26 is provided which is clamped between an annular collar 27 of control casing 12 and end wall 6.

Provided in the diametrically opposite channels 19 which extend radially outwardly in control casing 12 are two opposed grooves 28 as best seen in FIG. 3 into which holding members 29 are laterally engaged and retained therein. Holding members 29 urge working piston 10 against an end surface 30 of annular collar 27, holding it axially in this position. Holding members 29 which, for example, may be plane plates, have one surface in abutting engagement with the channel wall 31 (FIG. 3) lying close to annular collar 27, so that the channel sections provided on the other side of holding members 29 still have a sufficient area of cross section to control working chamber 9. As best seen in FIG. 2, the stepped sections of holding members 29 extending out of control casing 12 have their wall surfaces 32, which are close to control casing 12, in abutting engagement with control casing 12. An annular bead 33 provided on rolling diaphragm 11 is in abutment with the radially outer end surfaces 34 of holding members 29 and secures holding members 29 radially in their mounted positions. The radially inner ends of holding members 29 engage into a groove 35 provided on the circumference of control piston 16. In a direction opposite to the actuating direction, control piston 16 has the end surface of its groove 35 in abutment with holding members 29. This provides a stop for control piston 16 in the release direction. In the mounting position, the radial length of the holding member sections extending into control casing 12 is so dimensioned that a radial clearance is provided between control piston 16 and holding members 29 so that the ease of motion of control piston 16 is not impaired.

It will also suffice to arrange only one holding member 29 in control casing 12. In this case, however, it will be necessary to provide an additional guide for the working piston on control casing 12, such as shown in FIG. 7, for example.

Figure 4:
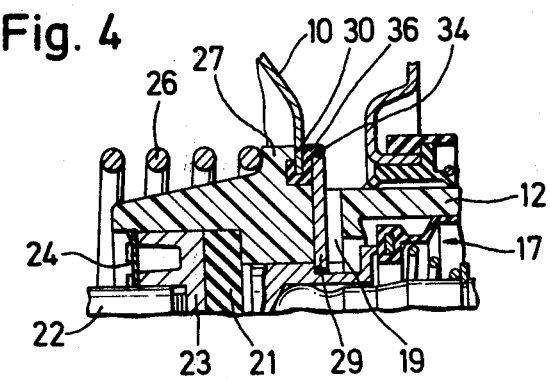
FIG. 4 is a partial longitudinal cross-sectional view of a brake booster illustrating a second embodiment of the connection of the control casing and working piston in accordance with the principles of the present invention including a sealing ring separated from the rolling diaphragm.

The fastening of working piston 10 as shown in FIG. 4 differs from the embodiment of FIG. 1 in that rolling diaphragm 11 is separated from seal 36 which embraces the inner section of the inner edge of working piston 10 in the manner of a U.

Figure 5:
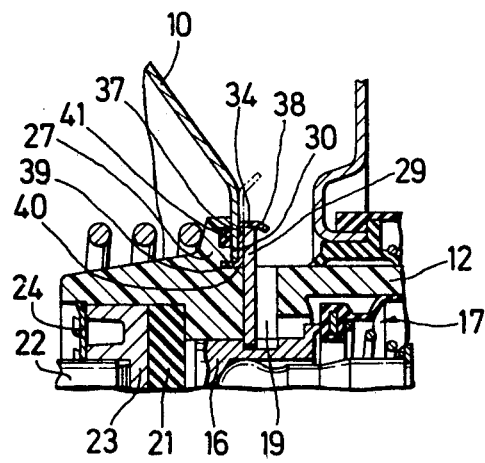
FIG. 5 is a partial longitudinal cross-sectional view of a brake booster illustrating a third embodiment of the connection of the control casing and the working piston in accordance with the principles of the present invention, including a sheet metal ring incorporating a sheet metal lug.
Figure 6:
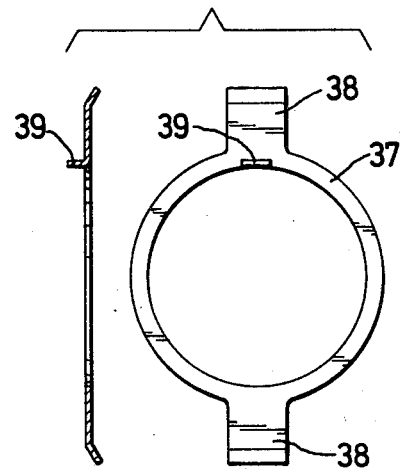
FIG. 6 is a plan view and a cross-sectional view of the sheet metal ring of FIG. 5.

Another embodiment of the fastening of the working piston 10 is shown in FIGS. 5 and 6. In FIGS. 5 and 6, a sheet metal ring 37 is arranged between working piston 10 and holding members 29 which includes, in the area of holding members 29, radially outwardly extending sheet metal lugs 38 which are bent during assembly of the power booster such that they abut against the radially outer end surfaces 34 of holding members 29 and secure holding members 29 radially in position. Arranged on the inner edge of sheet metal ring 37 is a pin 39 which is directed axially towards end surface 30, extends through the inner wall of working piston 10 and engages into a bore 40 extending in annular collar 27 axially in the actuating direction. To seal working piston 10 to control casing 12, an axial groove provided on annular collar 27 accommodates a sealing ring 41 which is in pressure-tight engagement with working piston 10.

Figure 7:
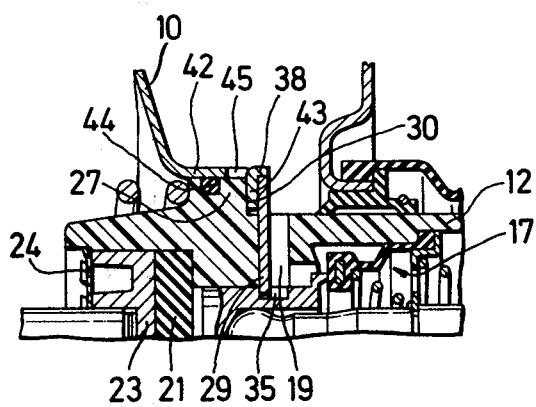
FIG. 7 is a partial longitudinal cross-sectional view of a brake booster illustrating a fourth embodiment of the connection of the control casing and the working piston in accordance with the principles of the present invention, including a cup-shaped section.

In FIG. 7, working piston 10 is of cup-shaped construction at its area of fastening to control casing 12 and has its cylindrical section 42 abutting the circumferential surface of annular collar 27. The annular bottom 43 of working piston 10 is in abutment with end surface 30 and is axially secured by holding members 29. The function of the sheet metal lugs 38 sheared from the cup-shaped section of working piston 10 has been described above with reference to FIGS. 5 and 6. A radial groove extending from the circumferential surface into annular collar 27 serves to receive a sealing ring 44 which seals the cylindrical section 42 to annular collar 27. Openings 45 produced by shearing of sheet metal lugs 38 are so dimensioned that they are not in contact with seal 44.

Figure 8:
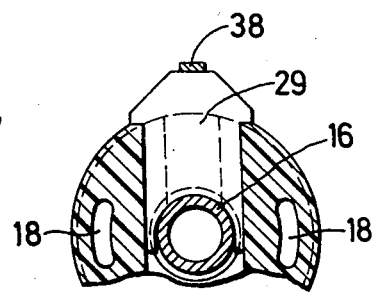
FIG. 8 is a partial cross-sectional view perpendicular to the longitudinal axis of the working piston of FIG. 7 taken in the plane of the holding member.

FIG. 8 shows a holding member 29 which with its inner section embraces control piston 16 in the manner of a U, thereby providing a maximum possible abutment area between holding member 29 and control piston 16. In this arrangement, it will be sufficient to utilize only one holding member 29 in control casing 12.

It will be an advantage if the surface section of control casing 12, upon which working piston 10 is held in abutment, directly or indirectly, in a radial direction relative to the longitudinal axis of the power booster, has a greater diameter than the neck of control casing 12. This affords ease of assembly of working piston 10 and avoids damage to the sliding surface formed on the neck of control casing 12.

While I have described above the principles of my invention in connection with specific apparatus, it is to be clearly understood that this description is made only by way of example and not as a limitation to the scope of my invention as set forth in the objects thereof and in the accompanying claims.

I claim:

1. A mechanically controlled brake power booster comprising:
    a booster casing;
    a booster piston disposed in and axially movable in said booster casing, said booster piston dividing said booster casing into a vacuum chamber and a working chamber;
    a control casing extending radially into and sealed relative to said booster casing, said control casing including therein a valve device to control the pressure in said working chamber and a radially extending channel extending from said valve device to said working chamber to connect said working chamber to a selected one of said vacuum chamber and atmosphere as controlled by said valve device, said valve device including a control piston actuated mechanically by an actuating rod; and
    at lease one holding member radially inserted into said channel and secured therein, said holding member having a first portion extending radially from said control casing to hold said booster axially against an annular collar provided on said control casing.

2. A power booster according to claim 1, wherein said holding member further includes a second portion within said control casing to provide a stop for said control piston in a rest position of said booster.

3. A power booster according to claims 1 or 2, wherein
    said channel includes two opposed grooves parallel to said collar in which said holding member in the form of a plane plate is engaged.

4. A power booster according to claim 3, wherein said holding member is in abutment with a wall of said channel adjacent said collar.

5. A power booster according to claim 4, wherein said holding member has a T-shape including a bar portion extending out of said control casing such that a surface thereof adjacent said control casing is in abutment with the outer surface of said control casing.

6. A power booster according to claim 5, wherein a clearance is provided in a radial direction between said control piston and an adjacent end of said holding member.

7. A power booster according to claim 6, further including an annular seal disposed between said collar and said booster piston.

8. A power booster according to claim 7, wherein said seal embraces an inner edge of said booster piston in the manner of a U, and
an end surface of said collar is in direct engagement with said booster piston radially outside said seal.

9. A power booster according to claim 8, wherein said seal includes a section thereof disposed between said annular collar and said booster piston prestressed in an axial direction.

10. A power booster according to claim 9, wherein said seal includes an annular bead engaging the outer end of said holding member.

11. A power booster according to claim 10, wherein the outer end surface of said holding member forms part of the superficies of an imaginary cylinder about a longitudinal axis of said control casing.

12. A power booster according to claim 7, wherein said seal is integrally formed with a rolling diaphragm of said booster piston.

13. A power booster according to claim 12, wherein said seal includes an annular bead engaging the outer end of said holding member.

14. A power booster according to claim 13, wherein said seal includes a section thereof disposed between said annular collar and said booster piston prestressed in an axial direction.

15. A power booster according to claim 14, wherein the outer end surface of said holding member forms part of the superficies of an imaginary cylinder about a longitudinal axis of said control casing.

16. A power booster according to claims 1 or 2, wherein said holding member is in abutment with a wall of said channel adjacent said collar.

17. A power booster according to claims 1 or 2, wherein said holding member has a T-shape including a bar portion extending out of said control casing such that a surface thereof adjacent said control casing is in abutment with the outer surface of said control casing.

18. A power booster according to claims 1 or 2, wherein a clearance is provided in a radial direction between said control piston and an adjacent end of said holding member.

19. A power booster according to claims 1 or 2, further including an annular seal disposed between said collar and said booster piston.

20. A power booster according to claim 19, wherein said seal embraces an inner edge of said booster piston in the manner of a U, and
an end surface of said collar is in direct engagement with said booster piston radially outside said seal.

21. A power booster according to claim 20, wherein said seal includes a section thereof disposed between said annular collar and said booster piston prestressed in an axial direction.

22. A power booster according to claim 21, wherein said seal includes an annular bead engaging the outer end of said holding member.

23. A power booster according to claim 19, wherein said seal is integrally formed with a rolling diaphragm of said booster piston.

24. A power booster according to claim 23, wherein said seal includes an annular bead engaging the outer end of said holding member.

25. A power booster according to claim 24, wherein said seal includes a section thereof disposed between said annular collar and said booster piston prestressed in an axial direction.

26. A power booster according to claims 1 or 2, wherein two diametrically opposite holding members are provided, each of said two holding members being disposed in a different one of two diametrically opposite ones of said radial channel.

27. A power booster according to claims 1 or 2, wherein said holding member is held in position radially by a sheet metal lug bent over the outer end of said holding member during assembly.

28. A power booster according to claim 27, wherein said lug is sheared from a cup-shaped section of said booster piston, said cup-shaped section being sealed relative to said control casing between an edge of said collar remote from said holding member and an opening formed by said lug.

29. A power booster according to claim 27, wherein said lug is a part of a sheet metal ring disposed between said booster piston and said holding member.

30. A power booster according to claim 29, wherein said ring includes a pin disposed adjacent an inner edge thereof extending axially through said booster piston into a bore of said collar parallel to a longitudinal axis of said control casing.

31. A power booster according to claims 1 or 2, wherein said booster piston is held in radial abutment with a surface of said control casing having a diameter greater than the diameter of that portion of said control casing extending through said booster casing.

* * * * *